May 14, 1963    N. HABER    3,089,652
GRINDER-BLENDERS
Filed Nov. 10, 1959

INVENTOR
NORMAN HABER

BY Berry & Crews

ATTORNEYS.

United States Patent Office 3,089,652
Patented May 14, 1963

3,089,652
GRINDER-BLENDERS
Norman Haber, New York, N.Y., assignor to Dynamos Company, New York, N.Y., a co-partnership
Filed Nov. 10, 1959, Ser. No. 852,088
1 Claim. (Cl. 241—79)

This invention relates to grinder-blenders for pulverizing and grading, or for pulverizing and blending or homogenizing, or otherwise mechanically combining solids with solids and/or with liquids.

Batch grinders and blenders of small capacity are commercially available at the present time, having blades disposed in the lower portion of a covered bowl which blades are driven at high rotary speeds, estimated to be of the order of ten thousand to twenty-five thousand revolutions per minute, by an electric motor.

The high rotary speed of the blades is an extremely desirable feature, particularly for the blending of solids with solids and solids with liquids. Not only is the high rate of relative movement of the blades and the material advantageous, but the blades act also to fan and circulate the air at high velocity, causing it to travel in a more or less definite course from the center outward along the bottom of the bowl, thence upward past the blades and along the periphery of the bowl, then inward along the cover, and finally downward to the center of the bowl bottom. The air travels rapidly enough to sweep material in the bottom of the bowl along with it, carrying the material outward and then upward into the field of action of the blade tips. This serves both to increase the frequency of contact of the material with the blades and to promote the rapid and intimate blending of diverse materials with one another. In returning to the bowl bottom the particles again pass the blades for further cutting action.

The commercial machines referred to have important drawbacks, however, some of which are outlined below.

In some of these machines the bowl is inseparably connected to the base housing of the motor, or the blades are inseparably united with the upper end of the motor shaft or with the bowl itself. The result is that the bowl can only be emptied by inverting the entire structure, or it can only be dried adequately after cleaning by reaching into the bowl alongside of the blades and under the blades with a towel. The need for inverting the machine in its entirety imposes an objectionable burden upon the user and limits the available size and capacity of the machine. The difficulty of cleaning and drying involves a waste of material, prevents full recovery of accurately measured amounts of material, and makes tedious and time-consuming the cleaning and drying operation that should desirably be kept simple and easy.

The commercial grinding machines provide no means of grading material. They act impartially upon fine particles as well as coarse ones, for a length of time estimated by the operator to be adequate for bringing all particles or nearly all particles down to the desired maximum size. This means that most of the material is reduced in size unnecessarily to sizes well below the maximum acceptable particle size, and that an excessive amount of fines is produced.

When fine dusts are desired, commercially available units do not have means of separating the powder which has been reduced to an adequate degree and withdrawing such powder from the field of blade action, nor of classifying the powder so withdrawn into a plurality of graded fractions.

Furthermore, each such machine performs only one function. In a grinder, for example, the bowl is open at the bottom and therefore is not capable of handling liquids. Nor will it serve equally well as a solids blender.

These commercial units are limited to batch operation, not being adapted for the continual feeding in of material to be reduced in size and/or blended, and the continual discharge of the reduced and/or blended material.

To the end of overcoming these shortcomings and drawbacks the present invention aims to provide a novel grinder-blender embodying all of the desirable and advantageous features of the presently available commercial machines referred to above, and characterized by the following additional features either separately or in combination:

(1) A ready separability of the bowl from the base housing and of the blades from the motor shaft, so that the bowl can be removed for emptying and cleaning and the parts can all be separately and conveniently cleaned;

(2) The inclusion of any one of a number of screens between the cover and the bowl for progressively sifting and withdrawing from the field of action, as the action progresses, those particles only which have been reduced to a size small enough to pass through the screen. This curtails over-reduction of the acceptable particles and tends to expedite the reduction of the oversized particles;

(3) The inclusion of a cover equipped with an extension duct having successive enlargements or chambers for the removal by gas or air conveyance of dust particles which have attained a prescribed degree of fineness, and for separating and separately collecting dust fractions of graded fineness;

(4) The inclusion, in combination with the duct referred to in the preceding paragraph, of means for admitting or introducing air or other aeroform fluid, protective or otherwise, continually into the bowl at a regulated rate for maintaining the flow of a dust carrying current of desired characteristics through the duct and for shielding the duct from a deleterious environment;

(5) The inclusion of means forming a separable sealing joint between the bowl and the blade driving shaft so that liquids can be successfully handled without leakage;

(6) The inclusion of means for continually feeding into the bowl materials to be reduced in size and/or blended, and for continually or intermittently discharging from the bowl the materials which have been reduced in size and/or blended, whether the materials be exclusively solid, exclusively liquid, or partly liquid and partly solid; and (7) The inclusion of means capable of batch handling either liquids or solids, in grinding, blending or homogenizing.

Other objects and advantages will hereinafter appear.

In the drawing forming part of this specification:

Figure 1:
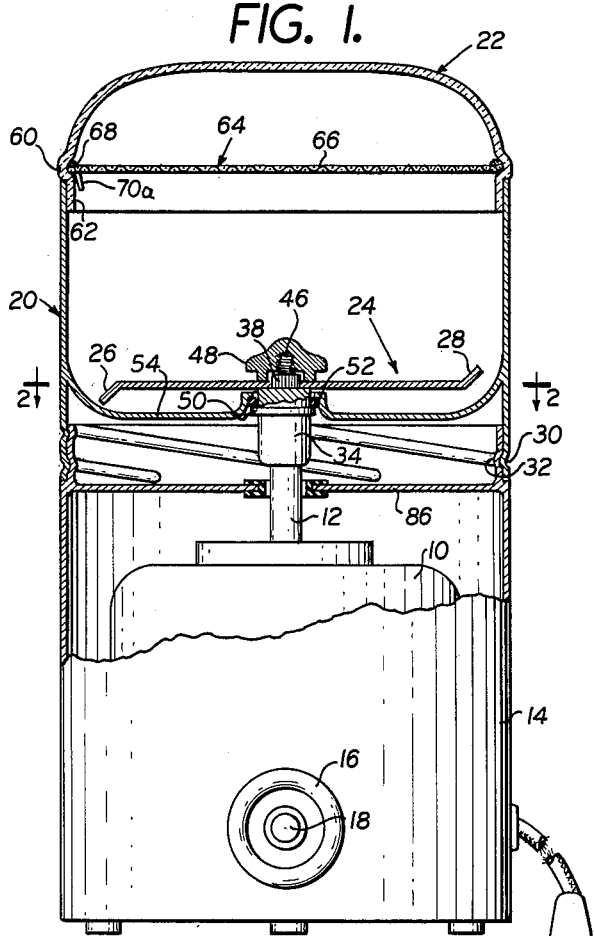
FIGURE 1 is a view in elevation, partly broken away, of an illustrative grinder-blender which embodies salient features of the invention.

The illustrative grinder-blender of FIGURE 1 comprises a high speed motor 10 having a vertically disposed drive shaft 12. A base housing 14 which surrounds and supports the motor in fixed position has an opening in one side for the admission of an electrical extension cord. A resilient rubber diaphragm 16 extends across an opening in the front of the base 14 and carries a push button 18, through which a normally open electric switch (not shown) may be pressed and held closed for operating the motor. As soon as finger pressure on the button is discontinued the diaphragm 16, through its resiliency, carries the button away from switch-closing position and thereby causes the motor to come to rest. Since considerable pressure is required to engage the switch, this constitutes a safety provision which ensures that the operator will not inadvertently introduce his hand into the bowl while the machine is in operation.

The base housing 14 is surmounted by a bowl 20 which is circular in cross-section at the bottom and at the brim but which may be of any desired configuration in horizontal section in the intervening region between the bottom and the brim. The motor housing includes a partition 86 which covers the motor and which is spaced a substantial distance away from the bottom of the bowl. The bowl has a removable, desirably transparent cover 22. The shaft 12 has secured upon its upper end, within the lower portion of the bowl 20, a single stiff integral blade member 24 which extends across the bowl to form diametrically opposed and mutually balanced blades having downturned and upturned tips 26 and 28, respectively.

The description as thus far given is equally applicable to the grinder-blender of FIGURE 1 and to some of the conventional machines previously referred to. The present structure, however, differs importantly from these known machines. In such machines the bowl is integral with, or inseparably attached to, the base housing; the bowl bottom extends around the motor shaft with a substantial clearance; and the blade member is inseparably secured to the upper end of the motor shaft or to the bowl.

In the illustrative structure of FIGURE 1 the bowl 20 and the base 14 are provided, respectively, with downturned and upturned flanges 30 and 32, the former fitting over and around the latter. The flanges 30 and 32 are formed with short, complementary, steep-pitched, multiple threads through which the bowl 20 can be connected and securely attached to, and separated from, the base housing 14.

In order for the bowl to be removable from the base housing, it is advantageous for the blade member 24 to be made readily detachable from the shaft 12. The shaft 12 is accordingly provided at its upper end with an enlargement 34 upon which the blade member 24 is supported. The enlargement is formed at its upper end with a flat-bottomed square-sided channel for receiving and confining the central portion of the blade member 24, the channel walls being indicated at 36.

From the center of the channel a reduced splined boss 38 rises, the boss being designed to enter and fit a complementary splined opening 40 which is formed in the central area of the blade member 24. As still further insurance against relative rotary movement or looseness of the blade relative to the shaft, the shaft is formed with pins 42 which extend upward at opposite sides of the boss 38 along the median line of the channel, and the blade member 24 is formed with correspondingly located holes 44 through which the pins fit.

Above the boss 38, the shaft 12 is formed with a further reduced threaded upper end 46 which receives a flanged clamping nut 48. The arrangement is such that the downwardly extending flange of the nut 48 will clamp the blade member firmly in place against the base of the channel with the central body portion of the nut spaced upward from the upper end of the splined boss 38. The nut 48 is desirably a knurled nut adapted for finger operation. The threads of the nut 48 and the shaft end 46 are made right-handed or left-handed according to the direction of rotation of the motor, the threads being so chosen that the nut will be tightened rather than loosened by the rotation of the shaft and blade member. Similarly, the threads of the flanges 30 and 32 are so chosen that the bowl 20 will be tightened rather than loosened relative to the base housing 14 by the rotation of the shaft and blade.

While the illustrative grinder-blender will often be used for grinding a single solid or for grinding or blending a plurality of solids, it is desirable that the grinder-blender be also designed for handling of liquids and solids. To this end a separable, liquid-tight joint is provided between the shaft enlargement 34 and the bowl base. The enlargement 34 of the shaft is provided with an outwardly extending flange 50 upon which an O-ring 52 is mounted, and the base 54 of the bowl 20 is provided with an upwardly displaced, inwardly extending flange to overlie the ring 50. When the nut 48 has been unscrewed and the blade member 24 has been removed, the bowl 20 may be unscrewed from the base housing 14 and separated from the base housing, the motor and the motor shaft, the O-ring 52 desirably, though not necessarily, remaining with the shaft enlargement 34. If there is any substantial quantity of liquid in the bowl, such disassembly will not ordinarily be initiated until after the liquid has been pumped, drained or siphoned off to a level below the rim of a raised central portion 56 of the bowl base, upon which the inwardly extending flange is formed.

The cover 22 preferably has a curvilinear or dome-shaped upper portion 58, a circumferential boss portion 60 designed to rest upon the rim of the bowl 20, and a skirt portion 62 that fits within the mouth of the bowl. The boss 60, as illustrated herein, differs from conventional structure in that it is gently rounded at its inner side, being designed to have auxiliary fixtures snapped into it and to retain such fixtures removably in place.

One very important novel fixture, in the form of a screen 64, is secured in place in FIGURE 1 for use in combination with the other elements of the novel grinder-blender. The screen 64, as illustrated, consists of woven wire 66 of any chosen fineness and a binding rim 68 of resilient material. The rim 68 is desirably made to include one or more finger tabs 70a for assisting in the withdrawal of the screen from the cover 20. A series of screens of different selected finenesses will ordinarily be provided for alternative use according to the varying requirements of different batches of material.

The screen may be used in either of two ways. According to one manner of use a batch of solid material is ground and/or blended without the screen in place. The cover 20 is then removed and fitted with a screen. The nut 48 and the blade member 24 are then removed. The cover is reapplied to the bowl and the bowl is detached from the base housing 14. The bowl and cover combination is then removed, inverted, and shaken to sift the acceptable particles into the inverted cover. The cover and bowl are then restored to an upright position, the cover is removed from the bowl and reinverted, the screen is removed from the cover, and the cover is emptied of its contents. According to this procedure, all the material, regardless of the degree of reduction to which it has already been subjected, remains in the bowl for a length of time estimated to be sufficient to complete the desired reduction.

The reduction of particle size can be effected more conveniently, in less time, and with much greater uniformity of product, by putting the selected screen into place before the grinder-blender is set into operation. As the particles are driven upward by the blades with great force, those which are fine enough to pass through the screen do so. Above the screen the particles lose their kinetic energy and settle back gently onto the screen, remaining trapped on top of it. The important advantage of this procedure lies in the fact that material trapped above the screen, all of which meets the specifications, remains outside the field of action of the blades and is not further reduced. Other particles which are too coarse to pass the screen, strike it with great force and are shattered, some of the pieces going on through the screen and other rebounding. Still other particles simply rebound for further treatment by the blades. Since the material remaining in the field of action of the blades consists largely of the now-concentrated oversize particles it progressively diminishes in quantity, gets swept out to the blade tips more promptly by the circulating air, and gets exposed to the action of the blades more frequently than by the method first outlined, so that the required reduction of particle size is achieved in a shorter time. At the conclusion of the operation there is no need to detach the blade member and the bowl. So long a there is no change in the kind of material acted upon the cover may simply be removed, emptied and replaced after a new batch of material has been put into the bowl.

When fine dust are required as an end product a cover 22a of the kind illustrated in FIGURE 4 may be substituted for the cover of FIGURE 1. The cover 22a may be generally of the same construction as the cover 22 of FIGURE 1, but it differs in two important features. A duct 70 leads upward and then outward from the center of the cover 22a. The duct includes successive enlargements or chambers 72 and 74, the latter being of greater cross-sectional area than the former.

A small duct 76 extends through the cover for introducing air or other suitable aeroform fluid, protective or otherwise, into the chamber formed by the bowl and cover through a regulating valve 77, so that there will be a slight but steady stream of air travelling at predetermined velocity from the bowl through the chamber 72 and 74 for conveying only fine dust from the bowl. The finenesses of the dust carried away will depend upon the strength of the conveying current. As the stream slows down in passing through the chamber 72 of smaller cross-section the coarser dust particles will be settled and collected, and as the stream passes through the chamber 74 of larger cross-section nearly all of the remaining, finer dust particles will be settled out and collected. The bodies of the chambers 72 and 74 may desirably be circular in horizontal cross-section. They are provided with fairly deepscrewed-on closure cups 79 at their lower ends. The cups provide a convenient means for removing and disposing of the collected dust fragments from time to time.

Figure 2:
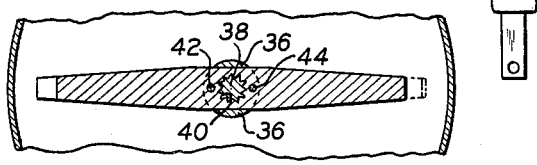
FIGURE 2 is a fragmentary, horizontal, sectional view, taken on the line 2—2 of FIGURE 1, looking in the direction of the arrows.
Figure 3:
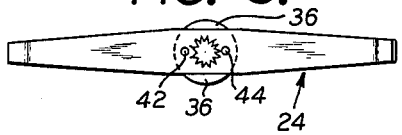
FIGURE 3 is a plan view of the blade and shaft assembly of FIGURE 1.

The grinder-blenders of FIGURES 1 and 4 may be made in various sizes, ranging from small laboratory models to industrial models of much greater capacity. The grinder-blender of FIGURE 2 is primarily intended for service of the latter kind. Under these conditions the rotary speed of the motor is required to be cut down, but the blades, because of their greater length, may be caused to have an even greater linear velocity at their tips than before.

The development of improved equipment for the blending of solids is sorely needed in the art, there being no equipment available at the present time which can be fairly described as efficient or adequate. Presently available equipment which is suitable for mastication, for mixing viscous and non-viscous liquids, and for effecting liquid-solid combinations is inadequate for the blending of solids with solids. The efficiency of achievement of uniform mixing is generally very low in terms of bulk turned over, the result being that mixing is achieved slowly. A visual appearance of homogeneity is often misleading, and repeated analyses of samples is generally required for gauging the progress of the blending. In pharmaceutical work a very potent or poisonous drug is often required to be mixed uniformly in the ratio of one pound of the drug to several hundred or even several thousand pounds of excipient. Insufficient mixing will provide an inadequate amount of the drug to a majority of the users and will provide an excess or over-dosage of the drug to the remainder. Both classes of patients are likely to suffer serious consequences.

I have described what I believe to be the best embodiments of my invention. I do not wish, however, to be confined to the embodiments shown, but what I desire to cover by Letters Patent is set forth in the appended claim.

I claim:

A grinder-blender comprising, in combination, a bowl having a bottom and side walls of uniform and symmetrical contour in all diametrical planes, a rotary blade, rotary driving means supporting the blade centrally of the bowl and near the bottom thereof, a cover removably mounted on the bowl, said cover being formed interiorly with a circular channel which extends completely around the cover at a level considerably below the top of the cover, and a screen of uniform fineness disposed within the cover, said screen having a resilient binding rim adapted to be snapped into and out of said channel.

References Cited in the file of this patent

UNITED STATES PATENTS

| | | |
|---|---|---|
| 288,550 | Coombes | Nov. 13, 1883 |
| 352,459 | Fuller et al. | Nov. 9, 1886 |
| 368,643 | Bierline | Aug. 23, 1887 |
| 398,373 | Bierline | Feb. 26, 1889 |
| 405,523 | Barton | June 18, 1889 |
| 606,174 | Wheat | June 21, 1898 |
| 710,604 | Osborne et al. | Oct. 7, 1902 |
| 816,281 | Van Sant | Mar. 27, 1906 |
| 1,044,796 | Marquardt | Nov. 19, 1912 |
| 1,508,031 | Simpson | Sept 9, 1924 |
| 2,257,672 | Christensen | Sept. 30, 1941 |
| 2,304,326 | Adams | Dec. 8, 1942 |
| 2,795,382 | Francesch | June 11, 1957 |
| 2,868,465 | Wieczorek | Jan. 13, 1959 |

FOREIGN PATENTS

| | | |
|---|---|---|
| 339,338 | Switzerland | Aug. 15, 1959 |
| 1,026,053 | Germany | Mar. 13, 1958 |
| 1,053,750 | Germany | Mar. 26, 1959 |